(Model.)
A. F. PETERS.
SHEET METAL ELBOW FOR PIPES.
No. 272,764. Patented Feb. 20, 1883.
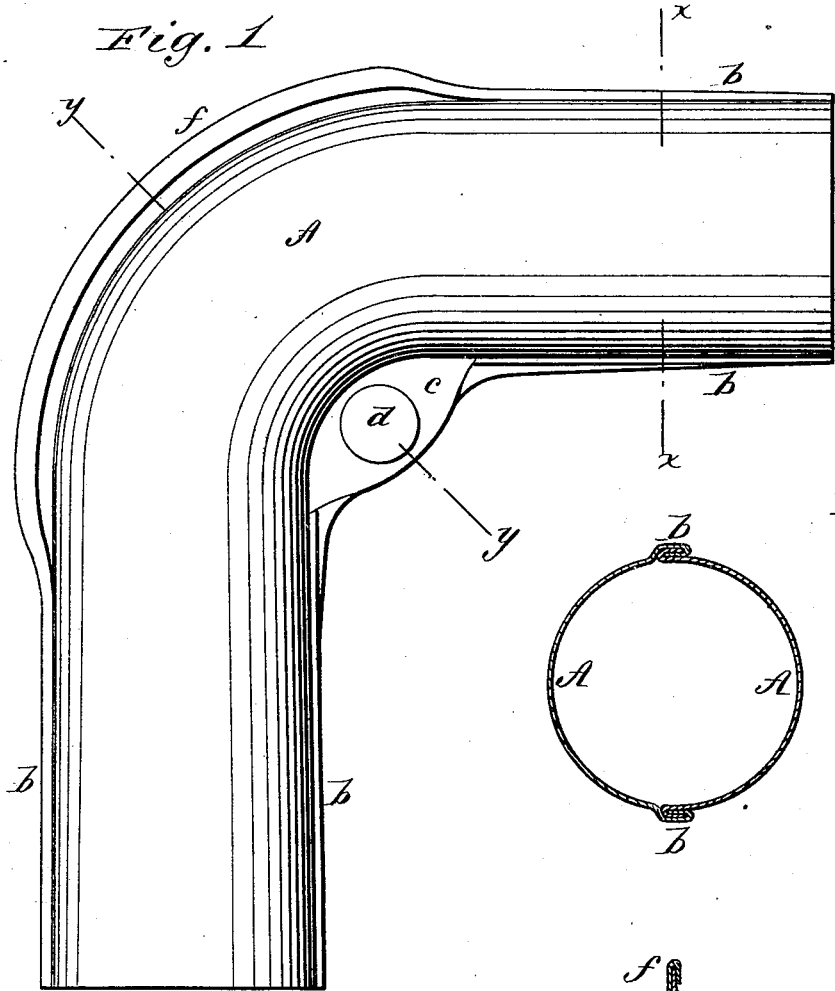
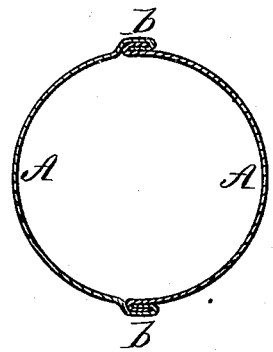
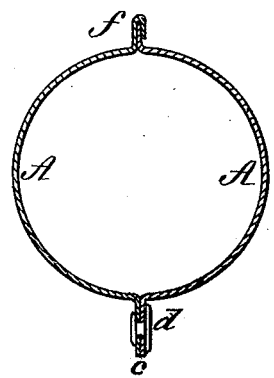
WITNESSES:
C. Neveux
C. Sedgwick
INVENTOR:
A. F. Peters
BY Munn & Co.
ATTORNEYS.

UNITED STATES PATENT OFFICE.

ALEXANDER F. PETERS, OF MILLBURY, MASSACHUSETTS.

SHEET-METAL ELBOW FOR PIPES.

SPECIFICATION forming part of Letters Patent No. 272,764, dated February 20, 1883.

Application filed October 31, 1882. (Model.)

*To all whom it may concern:*

Be it known that I, ALEXANDER F. PETERS, of Millbury, in the county of Worcester and State of Massachusetts, have invented a new and useful Improvement in Sheet-Metal Elbows for Pipes, of which the following is a full, clear, and exact description.

This invention relates to sheet-metal elbows for stove and other pipes; and it consists in a sheet-metal elbow made in longitudinal sections and pressed into shape, with close lap-folded seams or joints for portions of its length, and flange-joints at the bends of the elbow, substantially as hereinafter described, and whereby not only a smooth but very strong and durable elbow is produced in a cheap and expeditious manner, and the joints are protected from damp and the collection of soot.

Reference is to be had to the accompanying drawings, forming part of this specification, in which similar letters of reference indicate corresponding parts in all the figures.

Figure 1 represents a side view of a sheet-metal pipe-elbow embodying my invention; Fig. 2, a transverse section of the same on the line $x\,x$ in Fig. 1; and Fig. 3, a further transverse section on the line $y\,y$ in Fig. 1.

The sheet-metal pipe-elbow represented in the drawings is made in two horizontal parts or halves, A A, bent and pressed into shape in suitable molds, whereby both smoothness and exactness are insured. These pipe sections or halves are then closed and united by turning over the longitudinal marginal portions of one of said sections at the outer end parts of them, which are or may be straight, and afterward turning over and under this turned-over portion of the one section the corresponding longitudinal marginal portions of the other pipe-section, and pressing and flattening down the lap-folded joint or seam $b\,b$ thus made. The bent or curved portions of the pipe-sections are differently seamed or closed, however. Thus the marginal portions of the pipe-sections where the inner curve of the elbow comes are not turned over, but flattened or extended radially outward to form a plain or flat flange-joint, $c$, which is closed by a rivet, $d$, and the marginal portions of the pipe-sections where the outer curve of the elbow comes are likewise extended radially outward; but the one of such marginal parts of the one section is bent or turned over the other of such marginal parts of the other section, thereby forming a lap-folded flange, $f$, which constitutes a strengthening-comb on and along the outer curve of the elbow.

I am aware that sheet-metal pipe-elbows have before been made in longitudinal sections or halves, and said sections united by flange-joints. This, therefore, I do not claim; but,

Having thus described my invention, what I claim as new, and desire to secure by Letters Patent, is—

1. A sheet-metal pipe-elbow made in longitudinal sections or halves, closed by lap-folded joints or seams at its outer or straight portions and by flange-joints at its intermediate curved or bent parts, substantially as specified.

2. In a sheet-metal pipe-elbow made in longitudinal sections or halves A A, the combination, with the lap-folded joints or seams $b\,b$, of the comb or lap-folded flange $f$ on and along the outer curve of the elbow, essentially as described.

3. In a sheet-metal pipe-elbow made in longitudinal sections or halves A A, the combination of the plain or flange joint $c$, the lap-folded joints or seams $b\,b$, and the comb or lap-folded flange $f$, substantially as specified.

ALEXANDER F. PETERS.

Witnesses:
JOHN HOPKINS,
IRA N. GODDARD.